Feb. 12, 1946.  W. H. HOWE  2,394,549
SPECIFIC GRAVITY MEASURING DEVICE
Filed March 23, 1944
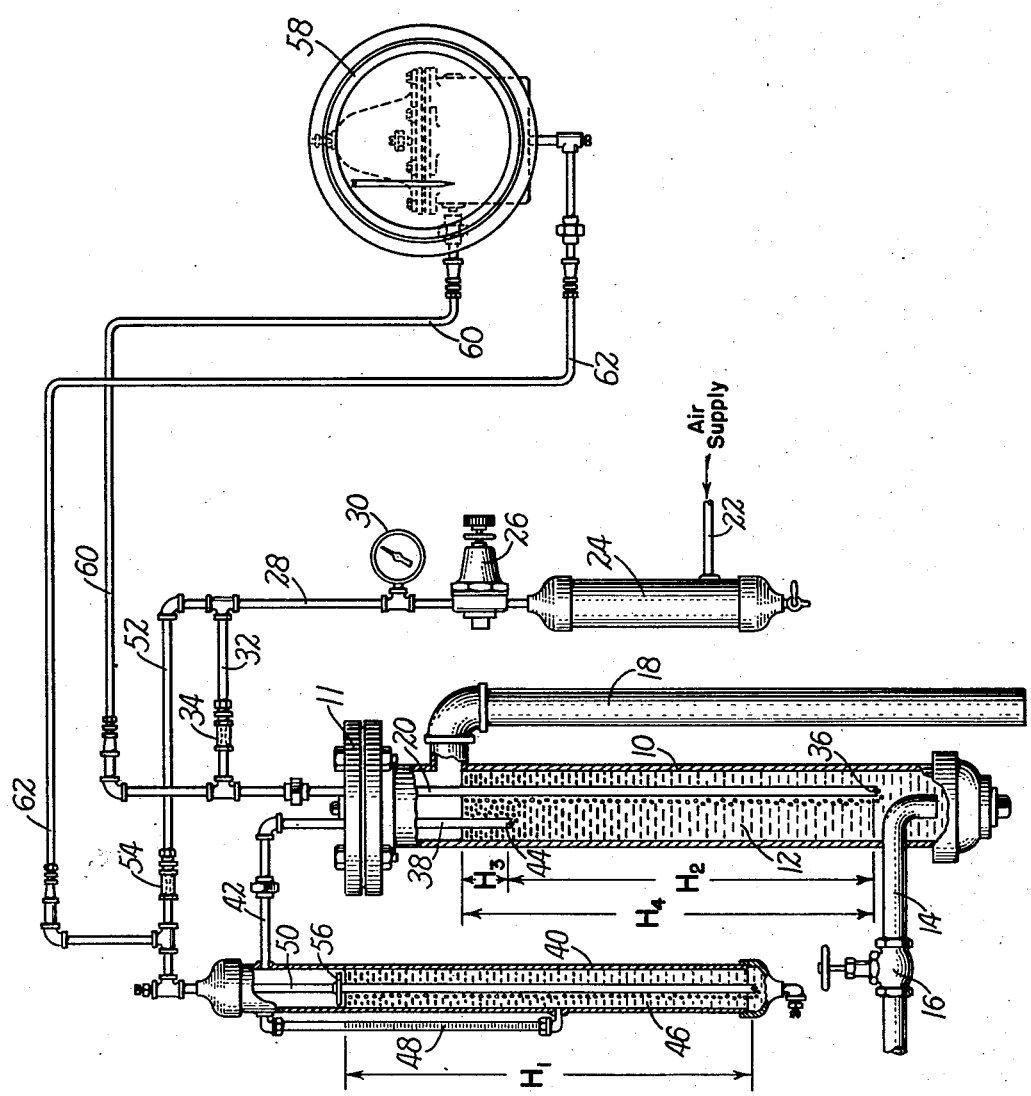
INVENTOR.
Wilfred H. Howe
BY
ATTORNEYS Patented Feb. 12, 1946

2,394,549

UNITED STATES PATENT OFFICE 2,394,549

SPECIFIC GRAVITY MEASURING DEVICE

Wilfred H. Howe, Sharon, Mass., assignor to The Foxboro Company, Foxboro, Mass., a corporation of Massachusetts Application March 23, 1944, Serial No. 527,720

8 Claims. (Cl. 73—32)

This invention relates to apparatus for measuring the density or specific gravity of a liquid, liquid mixture or suspension of solids in a liquid, all of which are herein referred to as liquids.

In one type of apparatus that has heretofore been used for this purpose the liquid of which the density is to be determined is caused to flow into and through a suitable chamber so constructed that liquid continually overflows from the chamber to maintain in the chamber a column of liquid of approximately predetermined height. Air is supplied through a tube to a point near the bottom of the column of liquid under a pressure sufficient to cause a continuous relatively slow flow of air into the liquid in such a manner that bubbles are formed which rise to the surface of the liquid. Under such circumstances the pressure of the air supplied substantially balances the weight of the column of liquid between the point of overflow and the point of admission of air at the delivery end of the bubble tube and hence the air supply pressure is a measure of the density of the liquid. Apparatus of this character is disclosed in Rowland Patent 1,822,458.

In apparatus of the type disclosed in the Rowland patent it is apparent that variations in the overflow level of the liquid will be reflected in changes in pressure in the bubble tube and hence will introduce errors into the density measurement. Such variations in liquid level may be produced in a number of different ways, such as, for example, by a surge in the flow of liquid through the measuring apparatus, or by the accumulation of rust or other obstructing material at the overflow lip. Furthermore, the air bubbles passing up through the column of liquid exert a lifting effect and hence variations in air flow may produce a variation in the overflow level.

In order to eliminate possible errors arising out of variations in overflow level due to the factors mentioned above it has also been proposed that two bubble tubes be immersed in the liquid in the measuring chamber with their delivery ends spaced a predetermined vertical distance apart and that the pressure difference between the two tubes be taken as a measure of the density of the liquid in the measuring chamber. With a construction of this type the reading of the measuring instrument is substantially unaffected by variations in liquid level or in the pressure above the liquid.

Although a double bubble tube apparatus of this type eliminates errors due to variations in liquid level it is subject to the disadvantage that it does not permit full and effective use of a differential meter having a given range. This disadvantage of the previously proposed apparatus may be most clearly explained by reference to a specific example: Assume that the differential meter available has a range of ten inches of water, that is, that it is capable of measuring differential pressures between zero and ten inches of water. Assume further that the specific gravity of the liquid to be tested varies between the limits 0.9 and 1.0. Under such circumstances the delivery ends of the two bubble tubes should be spaced apart a vertical distance of 10 inches. If they are spaced any greater distance apart then at a specific gravity of 1.0 the differential pressure will exceed the range of the measuring instrument. If on the other hand the delivery ends of the bubble tubes are spaced less than 10 inches apart, a smaller proportion of the range of the measuring instrument will be used, and there will be a resulting decrease in the accuracy of particular measurements.

For the conditions stated, it is apparent that only a part of the range of the instrument is used effectively. When the specific gravity of the liquid is 0.9, the differential pressure will be 9 inches of water, and when the specific gravity of the liquid is 1.0, the differential pressure will be 10 inches of water. Hence only $\frac{1}{10}$ of the measuring instrument is used, and from this it follows that the accuracy of a particular reading is only $\frac{1}{10}$ as great as it would be if the entire range of the instrument were utilized for measuring specific gravities between 0.9 and 1.0.

It is accordingly an object of the present invention to provide specific gravity or density measuring apparatus which, while retaining the benefits of the double bubble tube apparatus permits more effective utilization of a differential pressure measuring device having a given range.

It is a further object of the invention to provide apparatus capable of measuring the specific gravity or density of a liquid in an enclosed chamber under pressure or vacuum.

Other objects of the invention will be in part obvious and in part pointed out hereinafter.

The many objects and advantages of the present invention may best be appreciated by reference to the accompanying drawing which illustrates a preferred embodiment of the invention.

In the drawing the numeral 10 designates a measuring chamber containing the body of process liquid 12. Process liquid is supplied continuously to the chamber 10 through a pipe 14 provided with a regulating valve 16. The process liquid enters near the bottom of the chamber 10, flows upwardly through the chamber, and leaves through an overflow pipe 18. The discharge end of pipe 14 is turned downward to minimize the effect of the surge of entering liquid.

Partially immersed in the process liquid 12 there is a bubble tube 20 having a delivery end located at a distance below the surface of the liquid represented by the symbol $H_4$ in the drawing. Air to operate the bubble tube is supplied from a suitable source through pipe 22 and passes through a separator 24 which serves to remove any entrained and foreign matter from the air. From the separator 24 the air passes through a reducing valve 26 which reduces the pressure of the supply of air to a desired relatively low value, say 15 pounds per square inch. A pressure gauge 30 is provided in the pipe 28 to indicate air pressure on the down-stream side of the valve 26.

From the pipe 28 air passes through a branch pipe 32 to the bubble tube 20. Within the branch pipe 32 there is provided a restriction 34 that regulates the flow of air through the pipe and bubble tube in such manner that air slowly bubbles from the delivery end of the tube and upwardly through the body of process liquid 12. The delivery end of the bubble tube 20 is provided with one or more notches 36 which facilitate the formation of air bubbles at the delivery end of the bubble tube. The arrangement is such that the air pressure within the bubble tube 20 is substantially proportional to the height $H_4$ of process liquid above the delivery end of the bubble tube.

In addition to the bubble tube 20, the chamber 10 contains a second bubble tube 38 having a delivery end that is a relatively shorter distance below the overflow level of the body of liquid 12. In the drawing the depth of immersion of bubble tube 38 is represented by the symbol $H_3$. The distance between the delivery ends of the two bubble tubes is represented by the symbol $H_2$. Air to operate the bubble tube 38 is supplied from a reference chamber 40 through pipe 42. Bubble tube 38 like bubble tube 20 is provided at its lower end with a notch 44 to facilitate formation of air bubbles in the liquid body 12. The bubble tubes 20 and 38 are securely fastened to and supported by the cover plate 11 of chamber 10, and are thus maintained in predetermined spaced relation with respect to one another.

The reference chamber 40 contains a body of a reference liquid 46 which may be, for example, water or a relatively non-volatile liquid such as dibutyl phthalate, tricresyl phosphate, mercury, or the like, and is provided with a gauge glass 48 that indicates the level of liquid within the chamber. An advantage of using a relatively non-volatile reference liquid is that the tendency of the liquid to vaporize due to passage of air bubbles therethrough and the consequent change in liquid level is minimized by employing a liquid of low volatility.

Immersed in the body of reference liquid 46 there is a bubble tube 50 similar to the bubble tubes 38 and 20 and having a delivery end located below the level of reference liquid a distance indicated by the symbol $H_1$. Air to operate the bubble tube 50 is supplied at a controlled rate from pipe 28 through branch pipe 52 and a restriction 54 similar to the restriction 34. Mounted on the bubble tube 50 and confronting the surface of the reference liquid 46 there is a circular baffle plate 56. The baffle plate 56 preferably has a diameter only slightly less than that of the interior of chamber 40, and is positioned close to but slightly above the surface of the liquid within the chamber. It is apparent that air supplied to the bubble tube 50 bubbles up through the body of reference liquid 46 and then passes through pipe 42 to bubble tube 38 from the delivery end of which it bubbles into the process liquid 12.

The baffle plate 56 performs several functions. As air bubbles rising through the reference liquid reach the surface of the liquid and break, there is a tendency for droplets of the liquid to spatter to considerable heights, and be carried out with the air flowing out of the chamber, thus gradually reducing the liquid level in the reference chamber. The baffle plate 56 substantially prevents such spattering. Hence the level of the reference liquid is maintained more nearly constant by the use of the baffle plate.

The difference between the pressure in bubble tube 20 and the pressure in bubble tube 50 is measured by a differential pressure instrument 58 having a high pressure side which is connected by a pipe 60 with the bubble tube 20, and a low pressure side which is connected by a pipe 62 with the bubble tube 50. The instrument 58 may be an indicating or recording device or may be a controller controlling the flow of a material that affects the specific gravity or density of the process liquid. The instrument may be made to read directly in specific gravity or density units if desired.

The mode of operation of the above described apparatus and the way in which it attains the objectives set forth above may be explained as follows:

If it be assumed that $D_2$ = the specific gravity of the process liquid
$D_1$ = the specific gravity of the reference liquid
$Z$ = the differential pressure in inches of water and
$H_1$, $H_2$, $H_3$, and $H_4$ are expressed in inches, then the differential pressure $Z$ may be expressed by the following equation:

$$Z = H_4 D_2 - (H_1 D_1 + H_3 D_2)$$

It is apparent that this equation may be rearranged as follows:

$$Z = (H_4 D_2 - H_3 D_2) - H_1 D_1$$

It is further apparent that $$H_4 D_2 - H_3 D_2 = H_2 D_2$$

and therefore $$Z = H_2 D_2 - H_1 D_1$$

Since neither $H_3$ nor $H_4$ appear in this expression, the differential pressure $Z$ is independent of the overflow level of the process liquid in the chamber 10.

This independence of differential pressure with respect to liquid level increases the scope of applicability of the apparatus of the present invention in that the apparatus may be used to measure the specific gravity of a process liquid in a pressure vessel. For example, the bubble tubes 20 and 38 may be directly inserted in a body of liquid in an autoclave, or they may be inserted in the still kettle of a high pressure fractionating system to measure the specific gravity of a liquid contained therein. Similarly, the apparatus may be used to measure the specific gravity of a liquid contained in a vessel maintained at less than atmospheric pressure.

The way in which the apparatus of the present invention serves to improve the accuracy of the specific gravity measurements obtainable with a given type of measuring instrument may be best explained by reconsidering and extending the example previously given. In the example it was assumed that the specific gravity of the liquid might vary between 0.9 and 1.0 and that the range of the differential pressure measuring instrument was 10 inches of water. In order to utilize the complete range of the instrument effectively it is necessary that a change of 0.1 in the specific gravity of the process liquid produce a change of 10 inches in the differential pressure. Assuming that the reference liquid 46 in the reference chamber 40 is water, and recalling that the differential pressure Z for the system illustratively described above is equal to $H_2D_2-H_1D_1$ it is apparent that the desired relationship may be established by making the distance $H_2$ 100 inches and the distance $H_1$ 90 inches. Under these conditions, since the product $H_1D_1$ remains constant at a value of 90 inches, the differential pressure will be zero when the specific gravity of the process liquid is 0.9 and 10 inches when the specific gravity of the process liquid is 1.0. Thus the entire range of the measuring instrument will be effectively used and particular values of specific gravity may be determined with a greater degree of accuracy than would otherwise be possible.

From the above description it should be apparent that the present invention provides an apparatus of relatively simple construction which is capable of measuring specific gravity with a relatively high degree of accuracy. The accuracy of the measurement is unaffected by variations in the overflow level of liquid in the measuring chamber and the entire range of the measuring instrument is effectively used.

It is to be understood that the invention is not limited to the particular structure illustratively shown in the drawing. Thus, as pointed out above, the bubble tubes 30 and 28 may be directly inserted in a reaction chamber, still, evaporator or the like, to measure the specific gravity of a liquid contained therein. Further, it is well known that the specific gravity of a liquid varies with temperature and hence it may be desirable in some cases to immerse the measuring chamber 10, or the reference chamber 40, or both, in a constant temperature bath or otherwise control the temperature of the reference liquid and process liquid to eliminate any errors that might arise from this source.

Since many embodiments might be made of the above invention and since many changes might be made in the embodiment disclosed herein, it is to be understood that the foregoing description is to be interpreted as illustrative only and not in a limiting sense.

I claim:

1. In apparatus for measuring the specific gravity of a process liquid, in combination, a first chamber containing a body of said process liquid, a second chamber containing a body of a reference liquid, first gas supply means for supplying a limited flow of gas under pressure to a delivery point below the surface of said process liquid in said first chamber, second gas supply means for supplying a limited flow of gas under pressure to a delivery point in said second chamber which is a predetermined distance below the surface of said reference liquid whereby said gas continually bubbles upwardly through said reference liquid; third gas supply means for conducting the gas bubbling up through said reference liquid to a delivery point in said first chamber below the surface of said process liquid but a predetermined distance above the delivery point of said first gas supply means and means responsive to the difference between the gas pressures at the delivery points of said first and second gas supply means for indicating the specific gravity of said process liquid.

2. In apparatus for measuring the specific gravity of a process liquid, in combination, a first chamber containing a body of said process liquid, a second chamber containing a body of reference liquid, means for supplying process liquid continuously to said first chamber, means for removing process liquid continuously from said first chamber, a second chamber containing a body of a reference liquid, first gas supply means for supplying a limited flow of gas under pressure to a delivery point in said first chamber below the surface of said process liquid, second gas supply means for supplying a limited flow of gas under pressure to a delivery point in said second chamber which is a predetermined distance below the surface of said reference liquid whereby said gas continually bubbles upwardly through said reference liquid, third gas supply means for conducting the gas bubbling up through said reference liquid to a delivery point in said first chamber below the surface of said process liquid but a predetermined distance above the delivery point of said first gas supply means, and means responsive to the difference between gas pressures at the delivery points of said first and second gas supply means for indicating the specific gravity of said process liquid.

3. In apparatus for measuring the specific gravity of a process liquid, in combination, a first chamber containing a body of said process liquid, a second chamber containing a body of a reference liquid, a first gas supply conduit extending into said first chamber and having its delivery end below the surface of said body of process liquid, a second gas supply conduit extending into said second chamber and having its delivery end positioned a predetermined distance below the surface of said reference liquid, a third gas supply conduit connected at one end to said second chamber at a point above the surface of said reference fluid and at its other end extending into said first chamber to a point below the surface of said process liquid but a predetermined distance above the delivery end of said first conduit, means for supplying a limited flow of gas to said first and second conduits to cause gas to bubble upwardly through said process liquid and said reference liquid, and means responsive to the difference between the gas pressures in said first and second conduits for indicating the specific gravity of said process liquid.

4. In apparatus for measuring the specific gravity of a process liquid, in combination, a first chamber containing a body of said process liquid, means for supplying process liquid continuously to said first chamber, means for removing process liquid continuously from said first chamber, a second chamber containing a body of a reference liquid, a first gas supply conduit extending into said first chamber and having a delivery end positioned below the surface of said process liquid, a second gas supplying conduit extending into said second chamber and having a delivery end positioned a predetermined distance below the surface of said reference liquid, a third gas supply conduit connected at one end to said second chamber at a point above the surface of said reference fluid and at its other end extending into said first chamber to a point below the surface of said process liquid but a predetermined distance above the delivery end of said first conduit, means for supplying a limited flow of gas to said first and second conduits to cause gas to bubble up through said process liquid and said reference liquid respectively, and means responsive to the difference between the gas pressure in said first and second conduits for indicating the specific gravity of said process liquid.

5. In apparatus for measuring the specific gravity of a process liquid, in combination, a first chamber containing a body of said process liquid, a second chamber containing a body of a reference liquid, a first gas supply conduit extending into said first chamber and having a delivery end positioned below the surface of said process liquid, a second gas supply conduit extending into said second chamber and having a delivery end positioned a predetermined distance below the surface of said reference liquid, a third gas supply conduit connected at one end to said second chamber at a point above the surface of said reference liquid and at its other end extending into said first chamber to a point below the surface of said process liquid but a predetermined distance above the delivery end of said first conduit, a baffle plate in said second chamber confronting the surface of said reference liquid to minimize surging of the surface of said reference fluid, means for supplying a limited flow of gas to said first and second conduits whereby said gas bubbles upwardly through said process liquid and said reference liquid respectively and means responsive to the difference between the gas pressure in said first and second conduits for indicating the specific gravity of said process liquid.

6. In apparatus for measuring the departure of the specific gravity of a process liquid from a predetermined minimum value, in combination, a first chamber containing a body of said process liquid, a second chamber containing a body of a reference liquid, first gas supply means for supplying a limited flow of gas under pressure to a delivery point below the surface of said process liquid in said first chamber, second gas supply means for supplying a limited flow of gas under pressure to a delivery point in said second chamber that is a predetermined distance below the surface of said reference liquid, whereby said gas continuously bubbles upwardly through said reference liquid, third gas supply means for conducting the gas bubbling up through said reference liquid to a delivery point in said first chamber below the surface of said process liquid but a predetermined distance above the delivery point of said first gas supply means, the delivery point of said second gas supply means being at such a distance below the surface of said reference liquid that the pressure at the delivery end of said second gas supply means is the same as the pressure difference between the delivery ends of said first and third gas supply means when said process liquid is at said minimum specific gravity, and means responsive to the differences between the gas pressures at the delivery point of said first and second gas supply means for indicating the departure of the specific gravity of said process liquid from said minimum value.

7. In apparatus for measuring the departure of the specific gravity of a process liquid from a predetermined minimum value, in combination, a first chamber containing a body of said process liquid, a second chamber containing a body of a reference liquid, means for continuously supplying said process liquid to said first chamber, overflow means for continually withdrawing said process liquid from said first chamber, first gas supply means for supplying a limited flow of gas under pressure to a delivery point below the surface of said process liquid in said first chamber, second gas supply means for supplying a limited flow of gas under pressure to a delivery point in said second chamber which is a predetermined distance below the surface of said reference liquid, whereby said gas continuously bubbles upwardly through said reference liquid, third gas supply means for conducting the gas bubbling up through said reference liquid to a delivery point in said first chamber below the surface of said process liquid but a predetermined distance above the delivery point of said first gas supply means, the delivery point of said second gas supply means being at such a distance below the surface of said reference liquid that the pressure at the delivery point of said second gas supply means is equal to the pressure difference between the delivery points of said first and third gas supply means when the specific gravity of said process liquid is at said predetermined minimum value and means responsive to the difference between gas pressures at the delivery points of said first and second gas supply means for indicating the departure of the specific gravity of said process liquid from said predetermined minimum value.

8. In apparatus for measuring the departure of the specific gravity of a process liquid from a predetermined minimum value, in combination, a first chamber containing a body of said process liquid, a second chamber containing a body of a reference liquid, a first gas supply conduit extending into said first chamber and having a delivery end located below the surface of said process liquid, a second gas supply conduit extending into said second chamber and having a delivery end positioned a predetermined distance below the surface of said reference liquid, a transfer conduit connected at one end to said second chamber at a point above the surface of said reference liquid and at its other end extending into said first chamber to a point below the surface of said process liquid but a predetermined distance above the delivery end of said first conduit, the delivery end of said second gas supply conduit being positioned at such a distance below the surface of said reference liquid that the gas pressure at the delivery end of said second conduit is the same as the pressure difference between the delivery ends of said first conduit and said transfer conduit when the specific gravity of said process liquid is at said minimum value, means for supplying a limited flow of gas to said first and second conduits and means responsive to the difference in gas pressures in said first and second conduits for indicating the departure of the specific gravity of said process liquid from said predetermined minimum value.

WILFRED H. HOWE.

Certificate of Correction

Patent No. 2,394,549.  February 12, 1946.

WILFRED H. HOWE

It is hereby certified that error appears in the printed specification of the above numbered patent requiring correction as follows: Page 1, second column, line 32, before the word "measuring" insert *range of the*; and that the said Letters Patent should be read with this correction therein that the same may conform to the record of the case in the Patent Office.

Signed and sealed this 23d day of April, A. D. 1946.

[SEAL]

LESLIE FRAZER,
*First Assistant Commissioner of Patents.*